United States Patent [19]

Tanaka

[11] Patent Number: 4,842,385

[45] Date of Patent: Jun. 27, 1989

[54] ZOOM LENS

[75] Inventor: Tsunefumi Tanaka, Kanagawa, Japan

[73] Assignee: Canon Kabushiki Kaisha, Tokyo, Japan

[21] Appl. No.: 191,795

[22] Filed: May 2, 1988

Related U.S. Application Data

[63] Continuation of Ser. No. 622,687, Jun. 20, 1984, abandoned.

[30] Foreign Application Priority Data

Jun. 25, 1983 [JP] Japan ................................. 58-114486

[51] Int. Cl.[4] .......................... G02B 15/22; G02B 9/64
[52] U.S. Cl. .................................................... 350/427
[58] Field of Search ................................ 350/427, 423

[56] References Cited

U.S. PATENT DOCUMENTS

| | | | |
|---|---|---|---|
| 4,465,343 | 8/1984 | Horimoto | 350/427 |
| 4,492,437 | 1/1985 | Masumoto et al. | 350/427 |
| 4,586,793 | 5/1986 | Tanaka et al. | 350/423 |

FOREIGN PATENT DOCUMENTS 0091421  5/1983  Japan ................................. 350/427

Primary Examiner—John K. Corbin
Assistant Examiner—Rebecca D. Gass
Attorney, Agent, or Firm—Toren, McGeady & Associates

[57] ABSTRACT

The disclosed zoom lens employs rear focusing with inclusion of two lens portions, or a varifocal portion and a focusing portion arranged respectively from front (object) to rear (image). The components of the varifocal and focusing portions are arranged such that for a given finite object distance, the position of an image plane of the entire system is maintained constant despite zooming of the varifocal portion.

6 Claims, 5 Drawing Sheets

PRIOR ART FIG.1
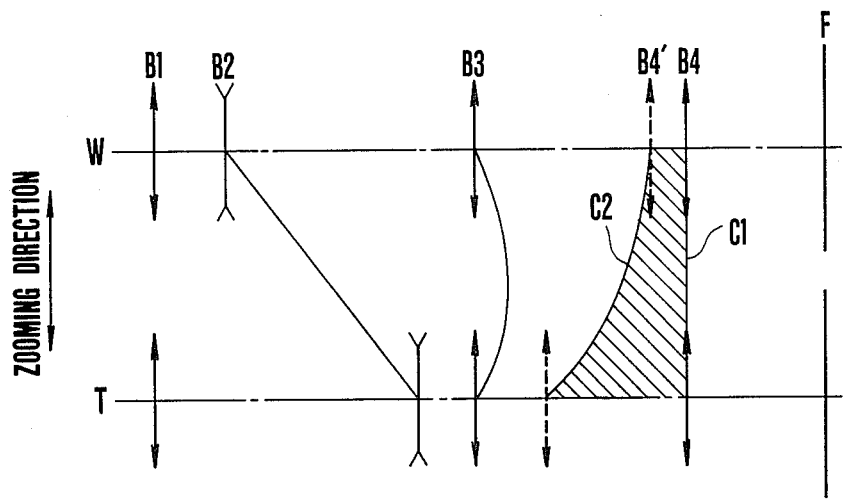
FIG.2
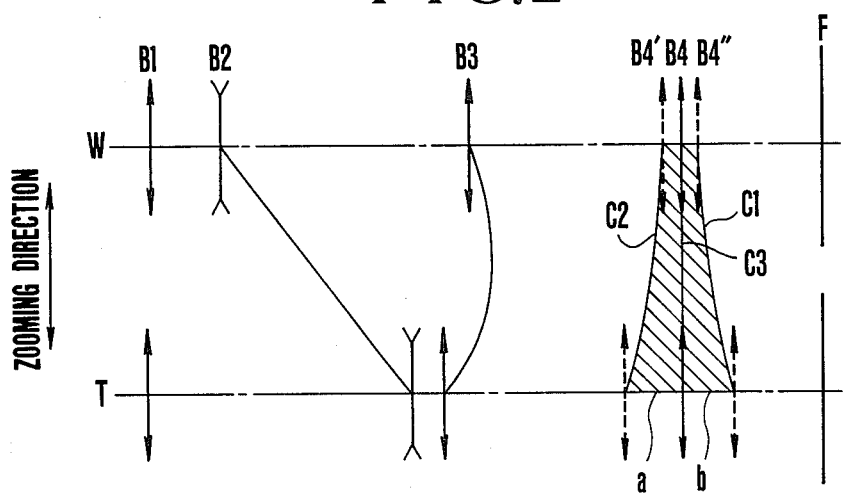

ZOOM LENS

This is a continuation of application Ser. No. 622,687, filed June 20, 1984 now abandoned.

BACKGROUND OF THE INVENTION

1. Field of the Invention

This invention relates to zoom lenses, and more particularly to zoom lenses employing a rear focusing method having a focusing portion arranged to the rear of a varifocal portion.

2. Description of the Prior Art

Focusing of conventionalzoom lenses is, in many cases, performed by moving the frontmost lens component axially forward. This focusing method has the drawback of increasing the diameter of the frontmost or focusing component. When applied to auto-focus instruments, the combined weight of the focusing component and an operating mechanism therefor is increased, the focusing speed is lowered, and a battery of increased capacity becomes necessary.

To eliminate the above-described drawbacks, another focusing method has been proposed. This involves imparting an independent movement either into one of the lens components that is movable for variation of the focal length, or into a lens component positioned nearer the image plane than the varifocal lens portion to remain stationary during the variation of the focal length, or the so-called rear focusing method. With this, a speedup of automatic adjustment of the focusing control and a minimization of bulk and size become possible. However, such rear focusing has an alternate drawback that for one and the same object distance the position of the focusing component must be changed as the focal length varies.

FIG. 1 schematically illustrates an example of a conventional optical system employing the rear focusing method, wherein W and T represent the wide angle and telephoto ends respectively, B1, B2, B3 and B4 designate the first to fourth lens components arranged from front (object) to rear (image) respectively, and F indicates a film plane. With an object at infinity, as the focal length varies, the position of the focusing component B4 remains unchanged, as indicated by a line C1. A curve C2 represents a locus of the component B4 under the condition that for an object at a minimum distance its image is always in sharp focus at the film plane F, in other words, under the in-focus condition. As is understandable from FIG. 1, for any finite object distance, the position of the focusing component B4 varies as a nonlinear function of the focal length of the entire system.

A specific example of such conventional optical system has the following numerical data listed in Table 1 for the focal lengths of the lens components, f, the shortest and longest focal lengths of the entire system, fW and fT respectively, the principal point intervals, e, with the subscript numerals numbered from front to rear, and with the subscript symbols W and T representing the wide angle and telephoto positions respectively.

TABLE 1

| | | |
|---|---|---|
| f1 = 100 | e1W = 5 | e1T = 33 |
| f2 = −40 | e2W = 40 | e2T = 9.73 |
| f3 = 90 | e3W = 10 | e3T = 12.27 |
| f4 = 150 | | |
| fW = 78.60 | | |

TABLE 1-continued fT = 160.90

Japanese Laid-Open Patent Application No. SHO 56-162727, provides a means for limiting the possible position of the focusing component B4 to the hatched area enclosed by the line C1 and the curve C2. The use of such means is, however, not always of assistance in speeding up the focusing operation. This is so because zooming from the telephoto to the wide angle position causes, the in-focus position for the focusing component to shift 75% for a varifocal ratio 2:1, or 90% for a varifocal ratio 3:1, from the distance it moves from the position for an infinitely distant object. Also, the curve C2 becomes rapidly steeper as the focal lengths nears the longest one. This leads to the drawback that the movement of the lens component B4 cannot be smoothly controlled.

SUMMARY OF THE INVENTION

An object of the present invention is to provide a zoom lens employing the so-called rear focusing method with the inclusion of two lens portions, or a varifocal portion in front and a focusing portion in the rear wherein for a distance at which a subject of principal interest is most often found in the ordinary photographic situations and has a high probability of being in motion during framing operations, changing of the magnification power can be performed without causing the in-focus position to shift, and wherein even when limitations are given for movement of the lens component for focusing, the magnification power varying operation can be smoothly performed. The subject matter of the present invention is that, in the rear focusing type of zoom lens, in which the total focusing movement differs with different focal lengths of the entire system, the differential relation in which lens components constituting the varifocal portion move axially to vary the magnification power is determined so as to maintain the position of an image plane during the variation of the magnification power constant despite the lens component of the focusing portion standing still at the in-focus position for a finite distance from the image plane to an object to be photographed.

BRIEF DESCRIPTION OF THE DRAWINGS

FIG. 1 is a schematic diagram of the paraxial arrangement of the components of the conventional rear focusing type zoom lens along with the moving loci of the zoom and focusing components.

FIG. 2 is similar to FIG. 1 except that a zoom lens of the present invention is illustrated.

DETAILED DESCRIPTION OF THE PREFERRED EMBODIMENTS

Figure 3:
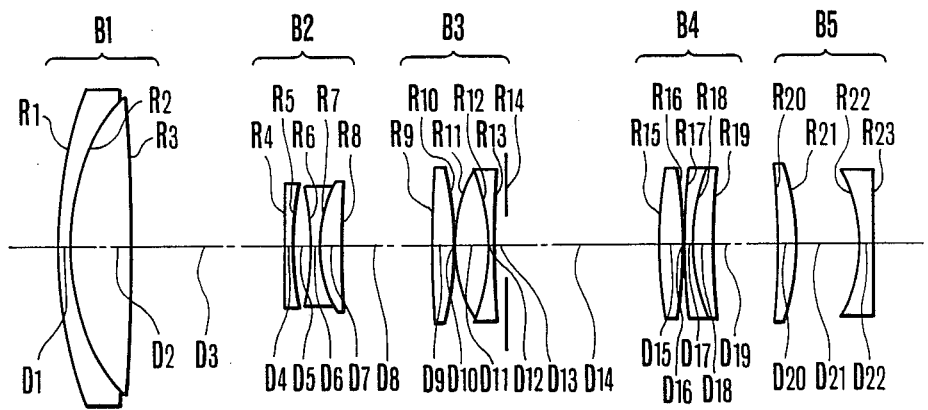
FIGS. 3 and 5 are lens block diagrams of first and second specific embodiments of the invention respectively.

In FIG. 2 there is shown a zoom lens of the invention along with its paraxial optical arrangement and the loci of movement of the zoom and focusing components thereof with variation of the magnification power.

In Table 2, a numerical example of the lens of FIG. 2 is given for the focal lengths of the lens components, fi, and the axial separations between the successive two lens components, ei, with the subscript symbols W and T representing the wide angle and telephoto sides respectively.

TABLE 2

| f1 = 100 | e1W = 5 | e1T = 33 |
|---|---|---|
| f2 = −40 | e2W = 40 | e2T = 13.91 |
| f3 = 90 | e3W = 10 | e3T = 8.09 |
| f4 = 150 | | |
| fW = 78.81 | | |
| fT = 150.09 | | |

The zoom lens of FIG. 2 comprises, from front (object) to rear image, a first component B1 which is stationary during focusing and zooming, second and third components B2 and B3 constituting a varifocal portion movable under the control of a zoom actuator, and a fourth component B4 constituting a focusing portion movable for focusing purposes. A straight line C3 indicates the position of the focusing component B4 for an object distance of 4 m. With the focusing component B4 left unchanged from this position, even when the magnification power is changed, the position of the image plane is maintained constant at F, because the zooming loci of the components B2 and B3 are so previously determined. B4' and B4" indicate phantom components moved axially to effect focusing to an object distance of 2 m and infinity, and curves C2 and C1 represent variations with zooming of the position of the focusing component for the object distance of 2 m and infinity respectively.

The required amount of movement of the focusing components for the various conditions are shown in Table 3 below.

TABLE 3

| | PRIOR ART | | |
|---|---|---|---|
| | K1 | K2 | |
| | X | X | Xa | Xb |
| W | −3.56 | −3.58 | −1.87 | 1.71 |
| T | −15.51 | −13.45 | −7.10 | 6.35 |

In Table 3, K1 and K2 represent the lenses of FIGS. 1 and 2 respectively, X represents the total focusing movement as focusing is effected down from infinity to 2 m, and Xa and Xb indicate the distances it moves from the position for the object distance of 4 m to effect focusing at 2 m and infinity respectively, with the rearward direction taken as positive. In this instance, for the telephoto position, letting "a" denote the value of Xa and "b" the value of Xb, we have $$a/b = -1.118$$

In FIG. 2, the hatched area enclosed by the curves C1 and C2 represents a range in which the component B4 can find itself optically significant. What efficiency the limitation of this range provides for automatic focusing has been accounted for in the above-cited Japanese Laid-Open Patent Application No. SHO 56-162727. In the present invention, it is an object to provide the possibility of remarkably reducing the angle each of the curves C1 and C2 makes with the vertical line, in other words, the gradient of shift of the focusing component against the change of the focal length even in the positions near the telephoto and as compared with FIG. 1. This leads to high speed and smooth automatic focusing.

What object distance is employed as the standard, that is, what value a/b is taken at, must be determined based on two factors. One factor is related to the type of automatic focusing device used and the other factor depends on the sort of photography usually performed.

With the lens of FIG. 2, when the absolute values of the forward and rearward parts "a" and "b" of the total focusing movement are equal to each other, the curves C1 and C2 have the gentlest curvatures. Therefore, it is desirable that $a/b = -1$. For a zoom lens of which the design minimum object distance ds is relatively farther and which is suited to snapshot photography at short distances, $a/b = -0.2$ or thereabout is preferable, and for a zoom lens which is adapted to be used in sports photography, $a/b = -4$ or thereabout is preferable.

Such various factors are all taken into account when a/b is determined. At any rate, however, if it falls outside a range between −0.2 and −4, which sets forth a rule of design of the invention, no improved results in the accuracy and reliability of automatic focusing control can be attained.

Supposing the minimum object distance (design minimum object distance) under the in-focus condition is ds, an object distance (standard object distance) d for which the lens component B4 is not required to be shifted for focusing at the time of zooming is preferably set within the range below:

$$2 < d/ds < 4$$

In the case of a zoom lens, the design minimum object distance ds is a value almost equal to ten times $\sqrt{fW \cdot fT}$, wherein fW is the focal length at the wide angle end and fT is the focal length at the telephoto end.

Figure 4:
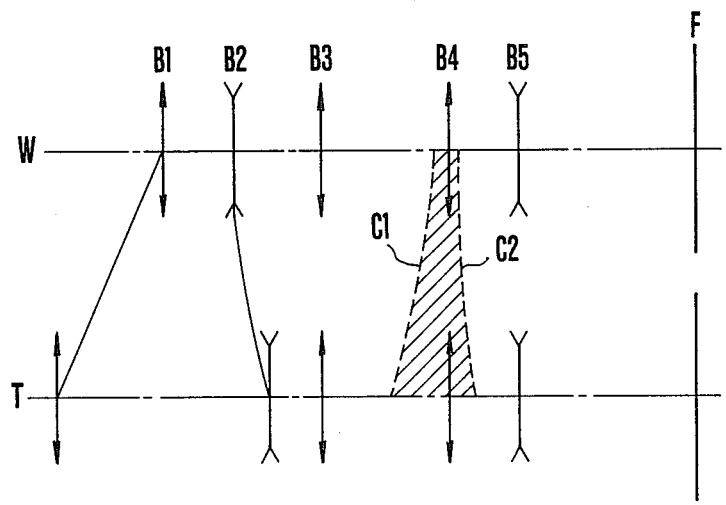
FIGS. 4 and 6 are schematic diagrams of the paraxial optical arrangements and moving loci of the components in the embodiments of FIG. 3 and FIG. 5 of the invention respectively.

A first example of a specific zoom lens of the invention is shown in FIG. 3, comprising five groups B1 to B5 of lens elements wherein the groups B1 and B2 are movable for zooming, the groups B3 and B5 are fixed, and the group B4 is movable for focusing. How to move the zoom and focusing groups is shown in FIG. 4.

Figure 5:
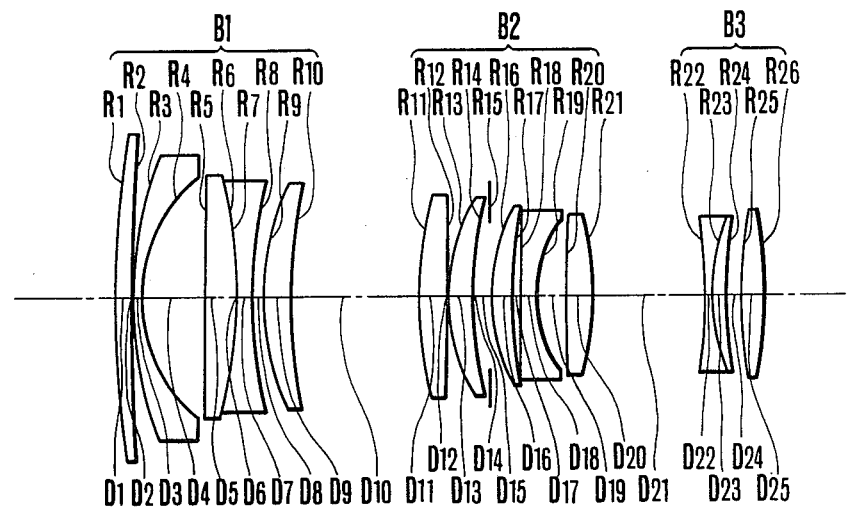
Figure 6:
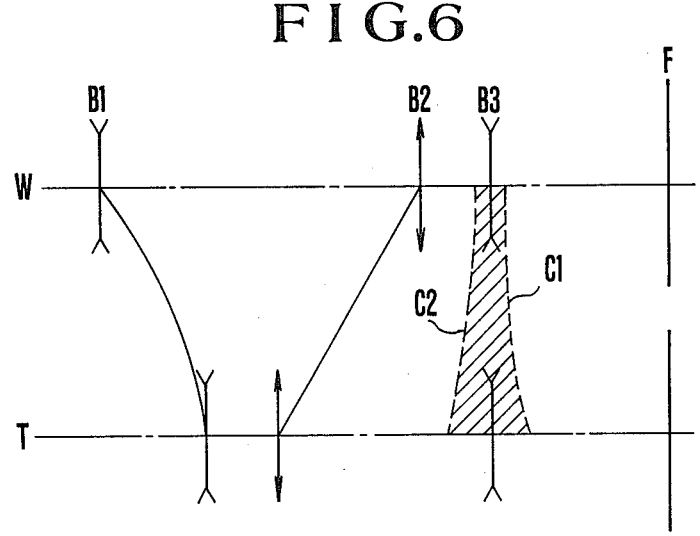
Figure 7:
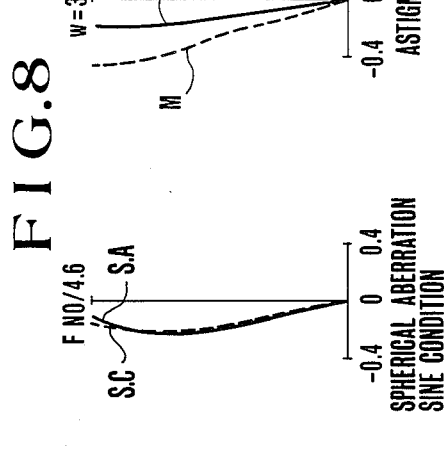
FIGS. 7 to 10 are graphic representations of the spherical aberration and astigmatism of the lens of FIG. 3 in the wide angle position with an object at 5 m and 1.5 m and in the telephoto position with an object at 5 m and 1.5 m respectively.
Figure 8:
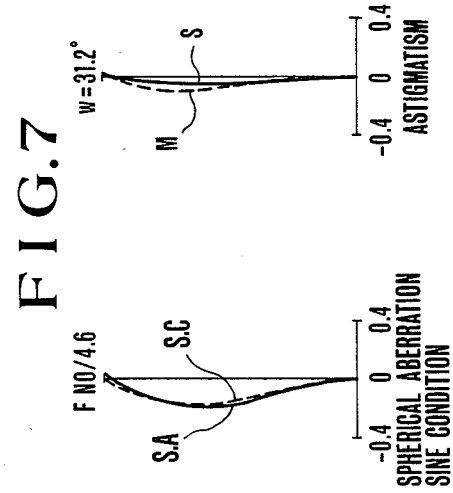
Figure 9:
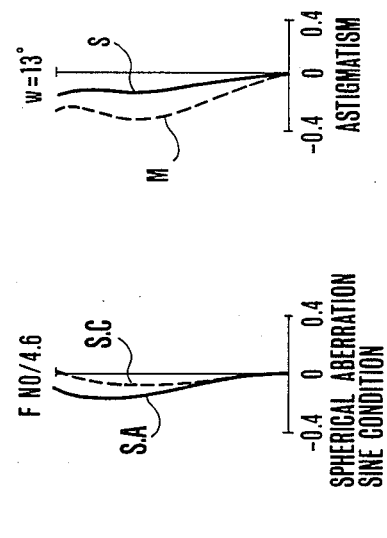
Figure 10:
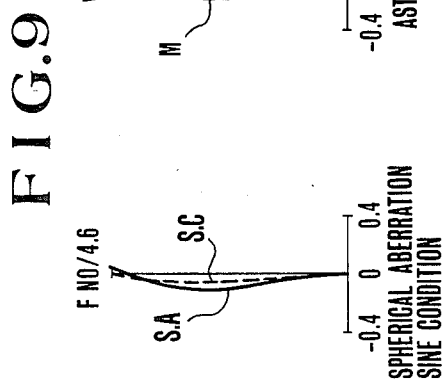
Figure 12:
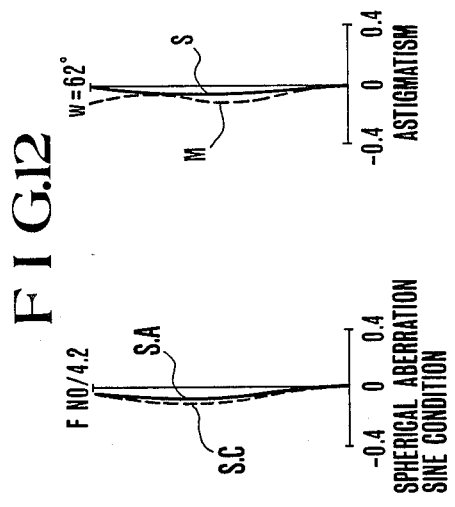
FIGS. 11 to 14 are graphic representations of the spherical aberration and astigmatism of the lens of FIG. 5 in the wide angle position with an object at 4 m and 1.5 m and in the telephoto position with an object at 4 m and 1.5 m respectively.
Figure 14:
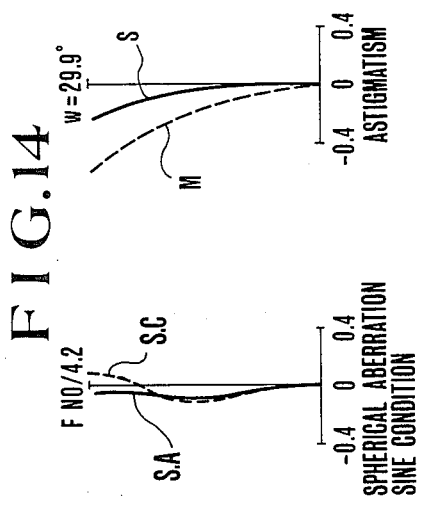
Figure 11:
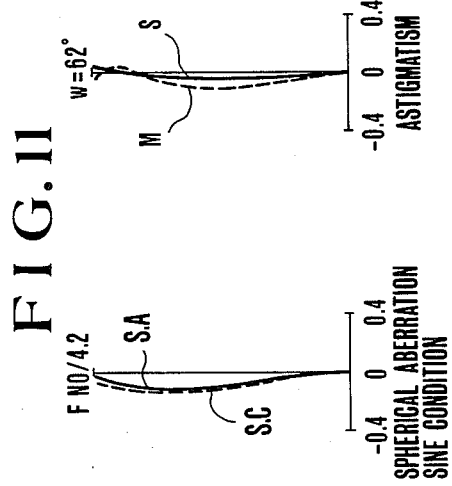
Figure 13:
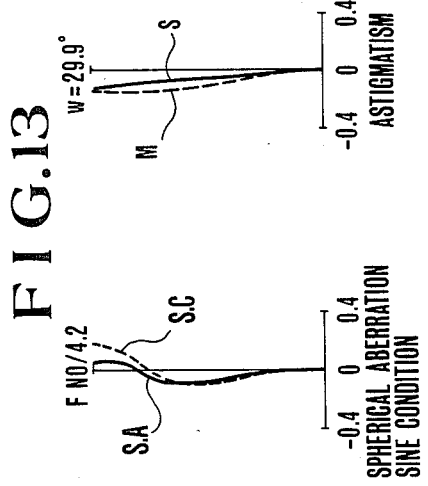

A second example of another specific zoom lens is shown in FIG. 5, comprising three groups B1 to B3 of lens elements, wherein the groups B1 and B2 are movable for zooming and the group B3 is movable for focusing. How to move the groups B1 to B3 is shown in FIG. 6.

The numerical data in accordance with which such two specific lenses can be constructed are given in Table 4 below for the focal lengths B1 to B5 of the lens groups, the radii of curvature R of the lens surfaces, the axial thicknesses and air separations D, the refractive indices N and the Abbe numbers ν of the glasses of the lens elements, with the subscripts numbered consecutively from front to rear. In the first example, $a/b = -2.5$, and in the second example, $a/b = -1.9$.

TABLE 4

Example 1:

|   | Wide Angle | Middle | Telephoto |
|---|---|---|---|
| f | 76.84 | 102.25 | 189.52 |
| F No | 4.6 | 4.6 | 4.6 |
| D 3 | 1.16 | 26.51 | 63.38 |
| D 8 | 18.68 | 15.82 | 5.11 |
| B1 | 136.77 | | |
| B2 | −29.49 | | |
| B3 | 50.50 | | |
| B4 | 112.37 | | |
| B5 | −123.19 | | |

Back Focus 49.39 (Object Distance = 5 m)

|  |  |  |  |  |  |
|---|---|---|---|---|---|
| B1 | R 1 = 77.18 | D 1 = 2.42 | N 1 = 1.80518 | $\nu$ 1 = 25.4 |
|  | R 2 = 43.88 | D 2 = 10.45 | N 2 = 1.58267 | $\nu$ 2 = 46.4 |
|  | R 3 = −294.75 | D 3 = Variable | | |
| B2 | R 4 = −584.03 | D 4 = 1.28 | N 3 = 1.77250 | $\nu$ 3 = 49.6 |
|  | R 5 = 50.01 | D 5 = 1.78 | | |
|  | R 6 = −52.80 | D 6 = 2.01 | N 4 = 1.77250 | $\nu$ 4 = 49.6 |
|  | R 7 = 28.93 | D 7 = 3.38 | N 5 = 1.84666 | $\nu$ 5 = 23.9 |
|  | R 8 = 198.07 | D 8 = Variable | | |
| B3 | R 9 = 214.01 | D 9 = 3.90 | N 6 = 1.860729 | $\nu$ 6 = 49.2 |
|  | R10 = −42.52 | D10 = 0.20 | | |
|  | R11 = 40.91 | D11 = 5.18 | N 7 = 1.51742 | $\nu$ 7 = 52.4 |
|  | R12 = −32.90 | D12 = 1.44 | N 8 = 1.80518 | $\nu$ 8 = 25.4 |
|  | R13 = 357.44 | D13 = 1.00 | | |
|  | R14 = 0.0 | D14 = 23.93 | | |
| B4 | R15 = 97.29 | D15 = 3.79 | N 9 = 1.53256 | $\nu$ 9 = 45.9 |
|  | R16 = −83.34 | D16 = 0.10 | | |
|  | R17 = 113.55 | D17 = 1.90 | N10 = 1.78590 | $\nu$ 10 = 44.2 |
|  | R18 = 36.07 | D18 = 3.47 | N11 = 1.56732 | $\nu$ 11 = 42.8 |
|  | R19 = 138.27 | D19 = 10.65 | | |
| B5 | R20 = −374.98 | D20 = 3.53 | N12 = 1.65844 | $\nu$ 12 = 50.9 |
|  | R21 = −43.35 | D21 = 10.85 | | |
|  | R22 = −24.92 | D22 = 2.39 | N13 = 1.62374 | $\nu$ 13 = 47.1 |
|  | R23 = 3882.89 | | | |

Example 2:

|   | Wide Angle | Middle | Telephoto |
|---|---|---|---|
| 1 | 36.09 | 62.06 | 80.81 |
| F No | 4.2 | 4.2 | 4.2 |
| D10 | 56.69 | 20.10 | 4.50 |
| D21 | 2.18 | 16.92 | 32.90 |
| B1 | −55.64 | | |
| B2 | 41.43 | | |
| B3 | −204.94 | | |

Back Focus = 48.48 (Object Distance = 4 m)

|  |  |  |  |  |
|---|---|---|---|---|
| B1 | R 1 = 174.77 | D 1 = 2.77 | N 1 = 1.60311 | $\nu$ 1 = 60.7 |
|  | R 2 = 844.52 | D 2 = 0.15 | | |
|  | R 3 = 67.40 | D 3 = 1.28 | N 2 = 1.80400 | $\nu$ 2 = 46.6 |
|  | R 4 = 25.75 | D 4 = 9.92 | | |
|  | R 5 = 665.52 | D 5 = 5.14 | N 3 = 1.63636 | $\nu$ 3 = 35.4 |
|  | R 6 = −68.11 | D 6 = 0.30 | | |
|  | R 7 = −67.87 | D 7 = 2.50 | N 4 = 1.80400 | $\nu$ 4 = 46.6 |
|  | R 8 = 81.124 | D 8 = 1.57 | | |
|  | R 9 = 41.49 | D 9 = 4.29 | N 5 = 1.80518 | $\nu$ 5 = 25.4 |
|  | R10 = 82.68 | D10 = Variable | | |
| B2 | R11 = 56.40 | D11 = 4.76 | N 6 = 1.71300 | $\nu$ 6 = 53.8 |
|  | R12 = −312.94 | D12 = 0.09 | | |
|  | R13 = 31.67 | D13 = 3.74 | N 7 = 1.77250 | $\nu$ 7 = 49.6 |
|  | R14 = 63.88 | D14 = 2.60 | | |
|  | R15 = 0.0 | D15 = 0.30 | | |
|  | R16 = 31.42 | D16 = 3.08 | N 8 = 1.71300 | $\nu$ 8 = 53.8 |
|  | R17 = 65.06 | D17 = 1.24 | | |
|  | R18 = 721.92 | D18 = 2.65 | N 9 = 1.84666 | $\nu$ 9 = 23.9 |
|  | R19 = 21.51 | D19 = 4.31 | | |
|  | R20 = 152.39 | D20 = 4.26 | N10 = 1.76200 | $\nu$ 10 = 40.1 |
|  | R21 = −56.91 | D21 = Variable | | |
| B3 | R22 = −116.73 | D22 = 1.40 | N11 = 1.79952 | $\nu$ 11 = 42.2 |
|  | R23 = 37.37 | D23 = 1.80 | N12 = 1.56732 | $\nu$ 12 = 42.8 |
|  | R24 = 59.63 | D24 = 2.78 | | |
|  | R25 = 79.94 | D25 = 3.66 | N13 = 1.66680 | $\nu$ 13 = 33.0 |
|  | R26 = −83.61 | | | |

FIGS. 7 to 10 are graphic representations of the spherical aberration and astigmatisms of the lens of FIG. 3 in the wide angle position with an object at 5 m and 1.5 m and in the telephoto position with an object at 5 m and 1.5 m respectively.

FIGS. 11 to 14 are graphic representations of the spherical aberration and astigmatism of the lens of FIG. 5 in the wide angle position with an object at 4 m and 1.5 m and in the telephoto position with an object at 4 m and 1.5 m respectively.

As has been described above, the zoom lens according to the present invention has its image plane stabilized to a small, if any, shift against change of the magnification power when shooting an object at a distance in which the ordinary photographic situations are encountered with high frequency and to which the subject of principal interest will probably be moving during the shooting, this affords the advantage that the finder image does not become sufficiently defocused during the framing operation of change of the magnification power. Another advantage arising in the lessened defocusing at the start of automatic focusing is that the time necessary to reach the in-focus condition is reduced. For example, in the case of single lens reflex cameras, as the object to be photographed is apt to take on action while the camera is being aimed, the possibility of losing sight of it by zooming is reduced. In addition thereto, the speed at which the automatic focusing device moves to follow during the variation of the magnification power is increased. This makes it possible to realize a zoom lens which has the merits of a single lens reflex camera.

What I claim:

1. A zoom lens comprising:
   from front to rear, a varifocal lens portion for varying the focal length of the entire zoom lens; and
   a focusing lens portion for performing focusing from an infinite object distance to a close object distance;
   said varifocal lens portion and said focusing lens portion being arranged such that for a predetermined finite object distance between said infinite object distance and said close object distance, despite said focusing lens portion being held stationary, the position of an image plane is maintained constant during variation of the focal length by said varifocal lens portion, said zoom lens satisfying the condition:

$-4 < (a/b) < -0.2,$ where a represents an amount of movement of the focusing lens portion, from a position when focused to said predetermined object distance to a position when focused to said close object distance, and b represents an amount of movement of the focusing lens portion from the predetermined object distance position to a position when focused to the infinite object distance.

2. A zoom lens according to claim 1, wherein said varifocal lens portion includes, from front to rear, two lens components of negative and positive powers, and at least one of said two lens components is made to move non-linearly to vary the magnification power.

3. A zoom lens according to claim 2, wherein a fixed lens component is arranged on the object side of said varifocal lens portion.

4. A zoom lens according to claim 1, wherein
   said varifocal lens portion includes, from front to rear, two lens components of positive and negative powers,
   wherein at least one of said two lens components is made to move non-linearly to vary the magnification power, and
   wherein a fixed lens component is arranged between said varifocal lens portion and said focusing lens portion.

5. A zoom lens according to claim 4, wherein a fixed lens component is arranged on the image side of said focusing lens portion.

6. A zoom lens according to claim 1, wherein said given finite object distance is set within the range below:

$2 < d/ds < 4$ wherein d denotes the given finite object distance and ds a minimum object distance during an in-focus condition.

* * * * *